United States Patent [19]

Lago

[11] Patent Number: 5,454,467

[45] Date of Patent: Oct. 3, 1995

[54] CHAIN CONVEYOR

[75] Inventor: Leopoldo Lago, Cittadella, Italy

[73] Assignee: Tecno Pool S.p.A., Marsango, Italy

[21] Appl. No.: 205,728

[22] Filed: Mar. 4, 1994

[30] Foreign Application Priority Data

Mar. 8, 1993 [IT] Italy .................... MI93A0440

[51] Int. Cl.⁶ ..................................... B65G 15/02
[52] U.S. Cl. ......................... 198/831; 198/778; 198/840; 198/841
[58] Field of Search .................... 198/778, 841, 198/831, 840, 837, 848, 850, 852; 62/381

[56] References Cited

U.S. PATENT DOCUMENTS

| | | |
|---|---|---|
| 2,446,890 | 8/1948 | Stadelman ................ 198/831 |
| 2,800,218 | 7/1957 | Drouin ................ 198/840 X |
| 2,877,888 | 3/1959 | Wittenberger . |
| 2,990,052 | 6/1961 | Stille et al. ................ 198/840 |
| 3,237,756 | 3/1966 | Pulver . |
| 3,270,863 | 9/1966 | Ackles . |
| 4,040,302 | 8/1977 | Katarao . |
| 4,244,464 | 1/1981 | van Capelleveen ........ 198/831 X |
| 4,850,475 | 7/1989 | Lupo et al. .............. 198/841 X |
| 5,228,557 | 7/1993 | Lago ......................... 198/778 |

FOREIGN PATENT DOCUMENTS

| | | |
|---|---|---|
| 0544085 | 6/1993 | European Pat. Off. . |
| 8623146 | 11/1986 | Germany . |
| 5132115 | 5/1993 | Japan ........................ 198/831 |
| 2108459 | 5/1983 | United Kingdom ........... 198/831 |

*Primary Examiner*—Joseph E. Valenza
*Attorney, Agent, or Firm*—Young & Thompson

[57] ABSTRACT

A chain conveyor, wherein the annular elements of one of the chains are connected to corresponding annular elements of the other chain by means of cross bars directly supported and guided by longitudinal slide elements arranged parallel along the path of the belt elements are also provided for the lateral centering of the belt, arranged on one side of at least one of the chains of the belt along all or part of the guide path, in particular along curved sections and at drive devices of the chains of the belt.

7 Claims, 4 Drawing Sheets

CHAIN CONVEYOR

BACKGROUND OF THE INVENTION

The present invention relates to a chain conveyor of the type comprising an endless conveyor belt sliding along guide means which develop along a predetermined path, wherein the conveyor belt comprises a first and a second drive chain formed by annular elements. The annular elements of one chain are connected to corresponding annular elements of the other chain by means of cross bars defining the surface of the conveyor belt. Drive means are also provided, comprising at least one drive wheel which drives a chain of the belt.

Chain conveyors, of the abovementioned type, are widely used in a number of areas due to their intrinsic features which allow them to support heavy loads and to operate in different environments.

In general, in chain conveyors of the known type, the whole conveyor belt is supported and guided by means of the same drive chains which slide along guide channels which surround part of the profile of the chain itself. Consequently chain conveyors of this type have a number of disadvantages due to their structure and the consequent manner of supporting and guiding the conveyor belt.

More particularly, the use of belt guide and slide elements in the form of a channel, or such as to surround substantially most of the profile of the rings of the chains, causes considerable dragging friction, not only due to the large surface of contact with the chains, but also to the additional friction caused by structural and assembly defects of the various parts which make up the system. In addition to the deformations caused by welding the cross bars to the chains, the inevitable irregularities of shape and size of the rings may cause greater friction against the guide surfaces and consequently require the use of more powerful drive assemblies, particularly for conveyors which develop along paths of considerable length or with extremely complex or spiral paths.

A further disadvantage consists in the excessive weight of the conveyor belt, due to the fact that the chains had to be dimensioned to resist the high drive stresses and due to the need to use cross bars with a considerable section in order to prevent their deformation and that of the conveyor belt itself on account of the long support distance of the bars, particularly in belts of greater width. Moreover, bars of greater section create once again greater weight for the belt to drive.

Furthermore, in known conveyors of the aforesaid type, in an attempt to reduce the friction between the chains and guide channels, a lubricating agent is poured into said channels. Said lubricant contaminates in many cases the product conveyed by the belt, also due to the fact that the conveying surface of the belt is formed by bars welded directly onto the rings of the chain, particularly if these bars are attached to the horizontal rings of the chain, and is therefore too close to said lubricated channels for guiding the chains.

The object of the present invention is to provide a chain conveyor belt, by means whereof it is possible to separate the drive function from that of supporting and guiding the belt, which are performed by separate parts, in this way allowing a considerable reduction in friction and hence the power required to drive the conveyor belt itself.

A further object of the present invention is to provide a chain conveyor of the aforementioned kind, by means of which it is possible to reduce the weight of the conveyor belt considerably, at the same time maintaining its good structural rigidity, in this way also aiding in further reducing the power required for the driving and sliding of the belt.

A further object of the present invention is that of providing a chain conveyor as defined above, wherein the width of the belt can be calculated wholly independently of the position of the guide elements, and of the drive chains, in this way achieving broad freedom of design and use of the conveyor belt.

Another object of the present invention is that of providing a chain conveyor wherein the risk of the lubricant contaminating the product conveyed by the belt is avoided.

These and other objects or advantages can be achieved with a chain conveyor provided with an improved guide system, according to the features of the main claim. In particular, the general solution concept consists in providing a chain conveyor of the type comprising two lateral chains whose annular elements are connected by cross bars, and wherein use is made of support and guide means which do not involve the drive chains, which comprise longitudinal support elements on which the conveyor belt slides, resting directly with the cross bars. The longitudinal belt support and slide elements can be positioned either inside or outside the drive chains, with the advantage of freeing completely the dimensioning of the belt from the positioning of the guide elements and of the drive chains, at the same time reducing the causes for friction and the surfaces of contact due to the sliding of the conveyor belt.

A chain conveyor according to the invention is moreover suitable for using cogged drive assemblies tangential to the chains, which can be advantageously arranged both in the plane of the conveyor belt, and in orthogonal planes.

A chain conveyor according to the invention can moreover be provided with elements for lateral centering of the chains, fully independent of the means of supporting and guiding the belt itself. This allows advantageous use of the guide system according to the invention, particularly in chain conveyors intended for use in cold-storage rooms, or in leavening or freezer rooms for food products, in which the formation of ice on traditional guides has always entailed serious problems, particularly when the conveyor is started up after a period of defrosting of the room, due to the tendency for ice to form in the guide channels and to block the sliding of the chains.

BRIEF DESCRIPTION OF THE DRAWINGS

These and further objects and advantages of the invention will be clear from the description which follows, with reference to some embodiments, in which.

DESCRIPTION OF THE INVENTION

Figure 1:
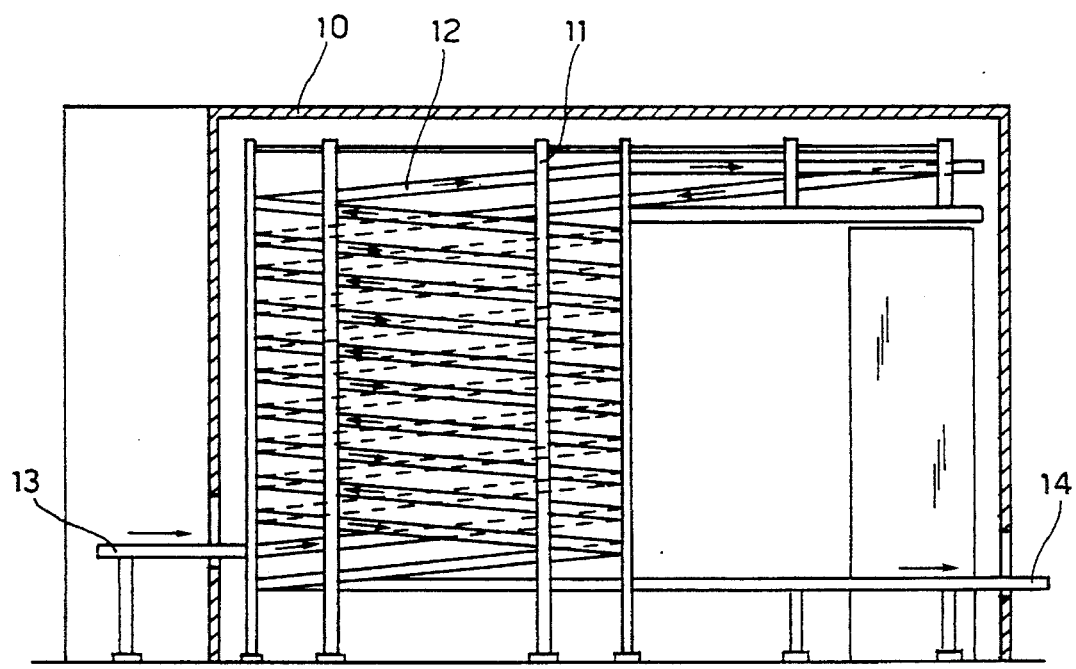
FIG. 1 shows a schematic section of a freezer room incorporating a chain conveyor according to the invention.

FIG. 1 illustrates, by way of an example, a chain conveyor of the spiral type, closed in a cold-storage or leavening room 10; the conveyor comprises a support structure 11 for an endless conveyor belt 12 of the chain type, which develops along a spiral path which rises and descends respectively starting from a point 13 of reception of the products to be conveyed towards a transfer point 14, placed substantially at the same level as the previous one.

One or more drive units 15, shown in FIG. 2, drive the conveyor belt along its closed path, in the manner specified hereinbelow.

Figure 2:
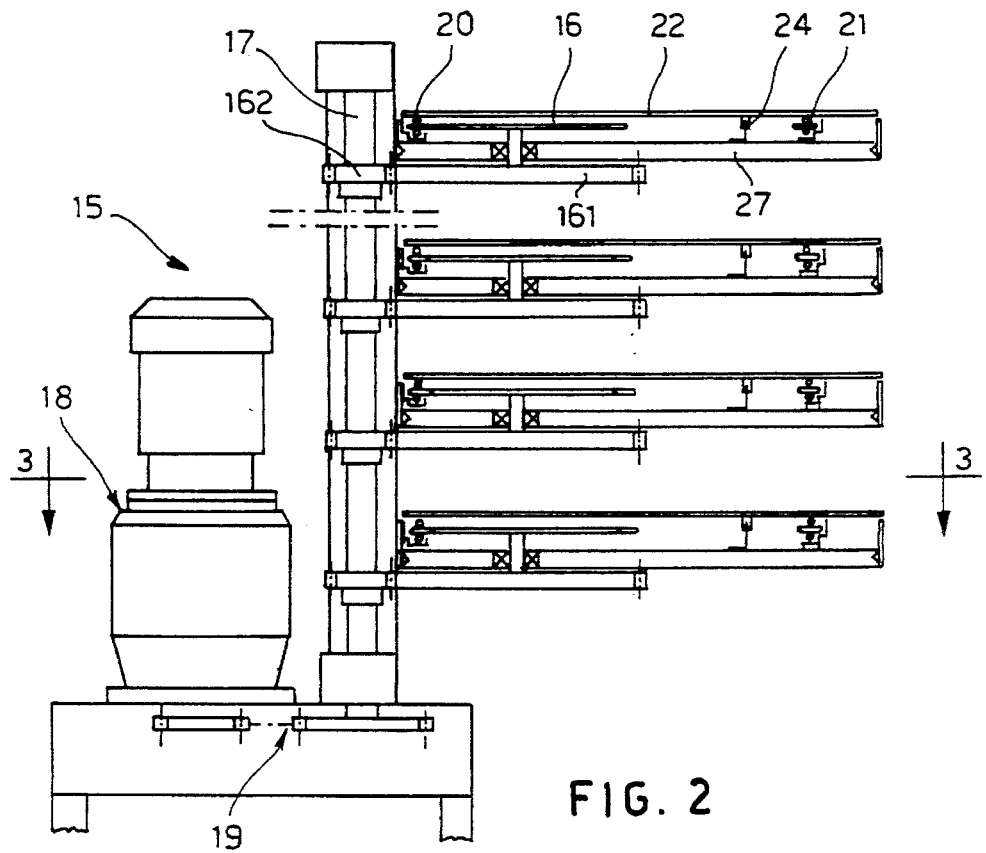
FIG. 2 is an enlarged detail of the drive part of the conveyor of FIG. 1.

Each drive device 15 in the example of FIG. 2 substantially comprises a plurality of cogged wheels 16, connected to a vertical shaft 17 which is moved by a ratiomotor 18 via a transmission 19. Each cogged wheel 16 is arranged horizontally inside the conveyor belt 12, engaging with one of the ring chains, in the manner illustrated in FIG. 3. Each drive wheel 16 is moreover connected coaxially to an underlying cogged wheel 161 supported rotatably by the frame of the conveyor. The cogged wheel 161 in turn engages with a cogged wheel 162 connected to the drive shaft 17.

Figure 3:
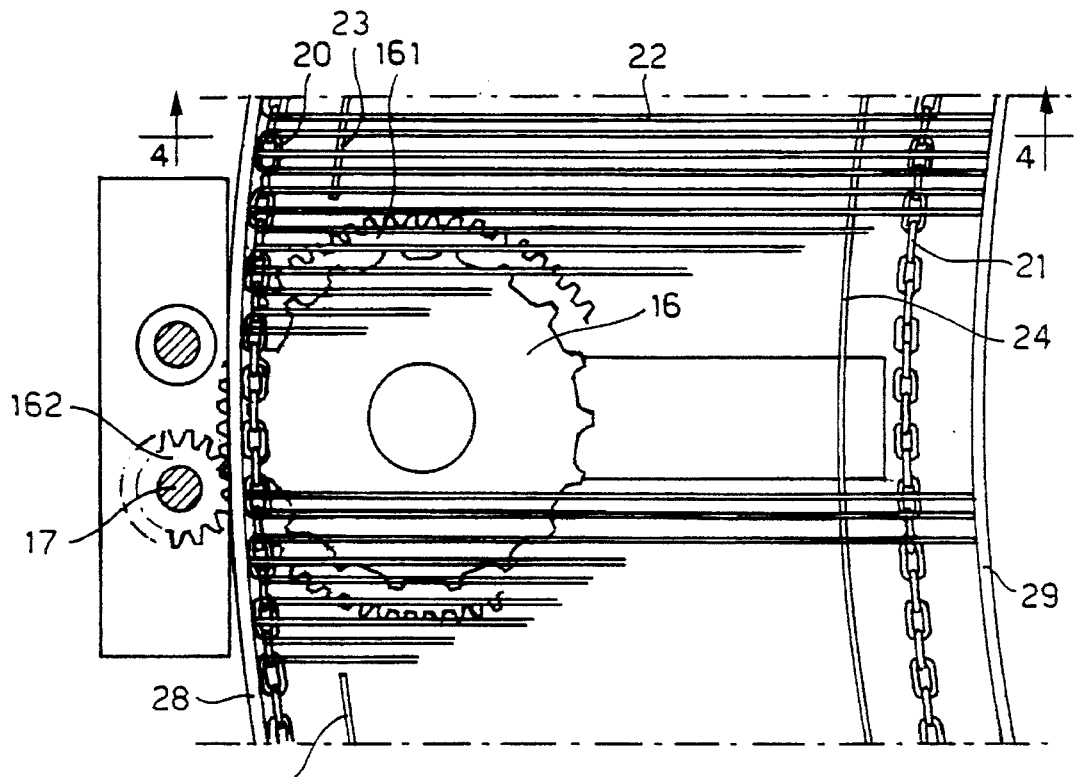
FIG. 3 is a plan view of part of the conveyor at a drive wheel coplanar to the belt.
Figure 4:
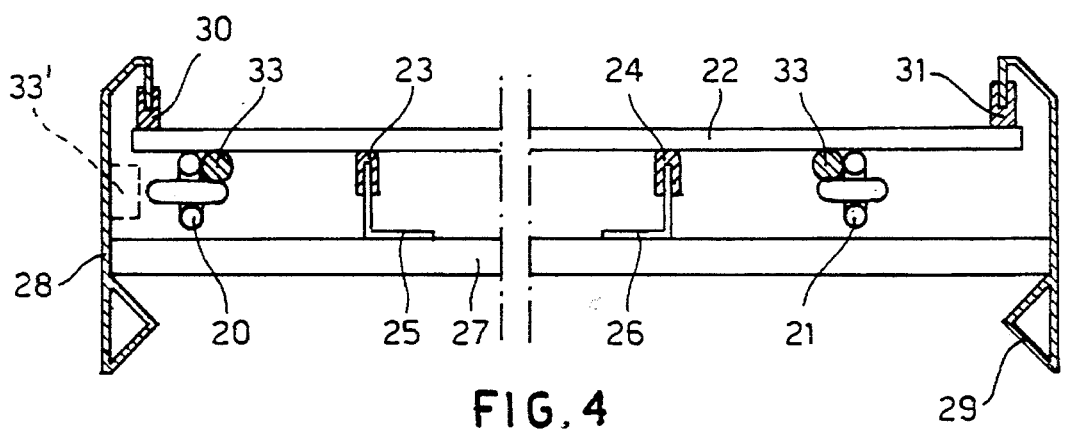
FIG. 4 is a section along line 4—4 of FIG. 3.

More particularly, as shown in FIGS. 3 and 4 of the accompanying drawings, according to a first embodiment, the conveyor belt 12 substantially consists of two ring chains 20, 21 which develop parallel along the endless path of the conveyor.

Each ring of a chain is connected to a corresponding ring of the other chain by cross bars 22 whose ends extend beyond the chains themselves. In this way the various cross bars 22 define the conveying surface of the belt.

The conveyor belt can develop along rectilinear or curved sections according to the path to be followed.

According to a fundamental feature of the present invention, which differentiates the chain conveyor of the present invention from chain conveyors of the known type, the conveyor belt 12 is no longer supported and guided in its sliding by the chains 20 and 21 which now perform the sole function of driving, but instead by longitudinal slide elements 23 and 24 formed for example by suitable plastic section bars. Said slide elements 23, 24 develop substantially for the entire path of the conveyor, only discontinued at the drive wheels 16. In this way the belt 12 slides supported by the same bars 22 whose support points, provided by the section bars 23 and 24, in the case of FIG. 3, are situated inside the drive chains, and in any case in a position distanced from the ends of the single bars of the belt. It is therefore possible, with equal belt length, in relation to systems known previously, to use cross bars of a smaller diameter given the greater proximity of the support points, as well as to use drive chains 20 and 21 which are only subjected to the pulling actions of the cogged wheels 16, being totally free of any other stresses and frictions generated by the guides. The whole belt 12 is therefore comparatively low in weight and thus requires lower drive powers.

Each guide section bar 23 and 24 is supported by the structure 10 of the conveyor, for example by means of appropriate angle bars 25, 26 in the manner shown, fixed to cross bars 27 which join the two lateral edges 28, 29 of the conveyor.

The slide section bars 23, 24 support the cross bars 22 of the conveyor belt from below as shown. Given that the bars 22 of the belt may rise, or be subject to vibrations, two more longitudinal guide section bars 30, 31 are provided to hold the bars 22 above, along the edges of the conveyor belt. The upper restraining section bars 30 and 31 are preferably attached to the downward-bent ends of the two sides 28, 29 of the conveyor, in the manner shown, although other solutions are possible.

Figure 5:
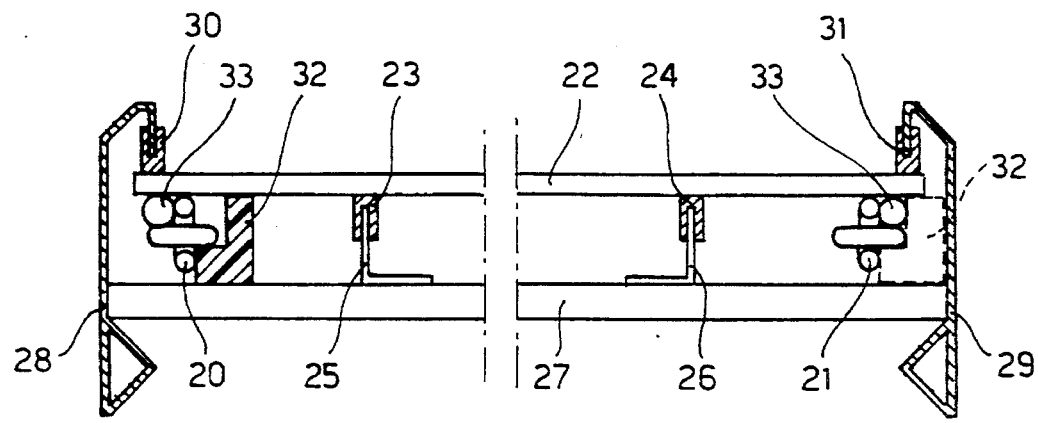
FIG. 5 is a section similar to that of FIG. 4, relating to another section of the conveyor.

In order to maintain the conveyor belt 12 appropriately centered, avoiding possible lateral listing at the drive wheels 16, for the entire path of the belt, or in predetermined parts, angles 32, FIG. 5, or buffers 33' FIG. 4 have been provided on one of the chains to prevent lateral listing of the chains 20, 21 without causing strong or excessive dragging friction.

These angles 32 may be variously positioned for a rectilinear or curved section of the conveyor, as shown in FIG. 5, arranging them on the internal and/or external sides of the chains, or alternatively only for the chain which is positioned on the outside of the curve, discontinuing them or arranging them differently, where necessary, for example at the drive wheels 16. FIG. 5 shows a particular arrangement of the chains 20 and 21 placed on the external sides of the guide section bars 23 and 24.

Figure 6:
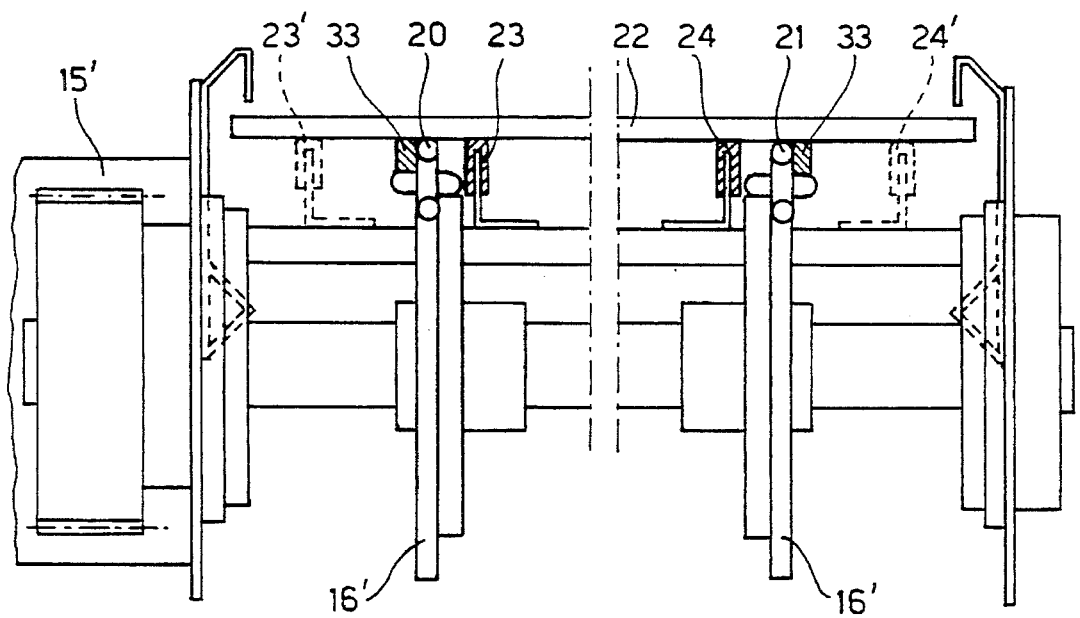
FIG. 6 is a transverse section similar to that of the previous figures, designed to illustrate, in addition to an arrangement of the drives, features differing from those shown previously.

FIG. 6 of the accompanying drawings instead shows an alternative whereby the ring chains 20 and 21 to which the bars 22 are welded, engage with drive wheels 16' arranged in vertical planes. The wheels 16' are connected in pairs to a motor drive unit 15' in the manner indicated schematically.

FIG. 6 of the drawings also shows a possible different arrangement of the chains 20 and 21 both in relation to the longitudinal guide elements 23 and 24, and in relation to the ends of the cross bars 22. In fact FIG. 6 shows a first central arrangement of the chains 20 and 21 on the external sides and in close proximity to the longitudinal guide elements 23 and 24, and a position inside guide elements 23' and 24' and further apart compared to the previous ones.

In this FIG. 6 it can also be seen how said longitudinal section bars 30 and 31 can be eliminated in some sections of the path.

Figure 7:
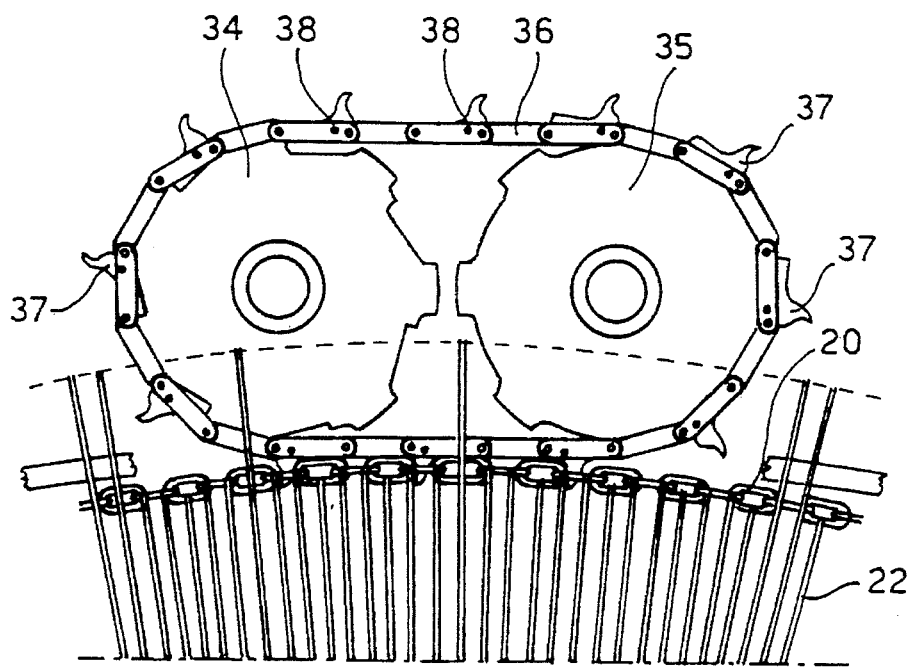
FIG. 7 is a plan view of a part of the conveyor which shows a further embodiment of the drive means.

The drive means may also act tangentially on a lateral chain of the belt, remaining horizontal and outside of the conveyor as shown in FIG. 7.

Said FIG. 7 shows in particular a drive assembly consisting of a first and a second cogged wheel 34, 35 arranged coplanarily one in relation to the other and parallel to the belt on which a closed sprocket chain 36 is wound, said chain having in turn a plurality of hooking teeth 37 equidistant one from the other and hinged to pins 38 of the sprocket chain and extending towards the outside of the sprocket chain. Said teeth 37 are inserted, as shown in FIG. 7, in the ring elements of one of the lateral chains of the belt.

This assembly is able to drive the belt with regularity, in that it always has two teeth engaged on the chain of the belt during driving, which avoid the disadvantages caused by systems with a single wheel in which there is a single tooth engaged with the chain of the belt and due to which, when the tooth is detached from the chain and the next tooth is engaged, the motion of the belt becomes irregular.

The use of the drive assembly of FIG. 7 is moreover particularly advantageous should it be necessary to hook the belt in a curved section for driving. The drive using a single cogged wheel, in order to prevent the cogged wheel from failing to hook the chain, must necessarily be positioned beneath the belt so that chain and drive wheel have curves of equal sign. With the drive group in FIG. 7 it is possible to engage the chain from the outside without any risk of it failing to hook up as clearly shown in FIG. 7.

Figure 8:
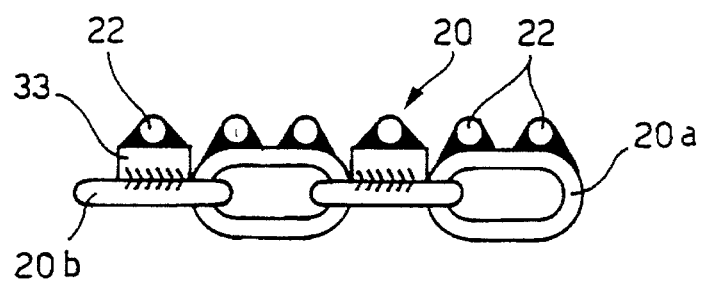
FIG. 8 is a detail of a drive chain.
Figure 9:
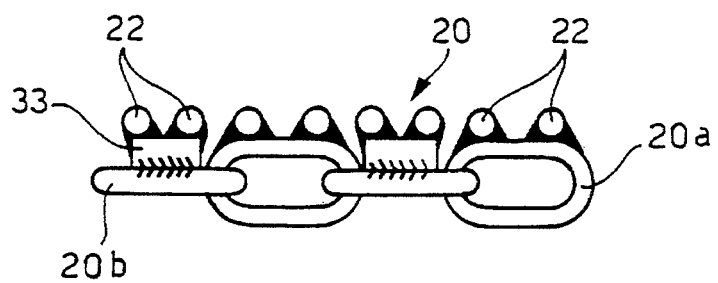
FIG. 9 is a detail of another type of drive chain.

As shown in FIGS. 8 and 9 for the chain 20, the cross bars 22 are attached directly to the vertical rings 20a whereas they are attached to the horizontal rings 20b by means of spacers 33 in order to position the bars 22 as high as possible in relation to the chain or other drive element, or in relation to any other element designed to restrain and guide the driving element of the belt.

Figure 10:
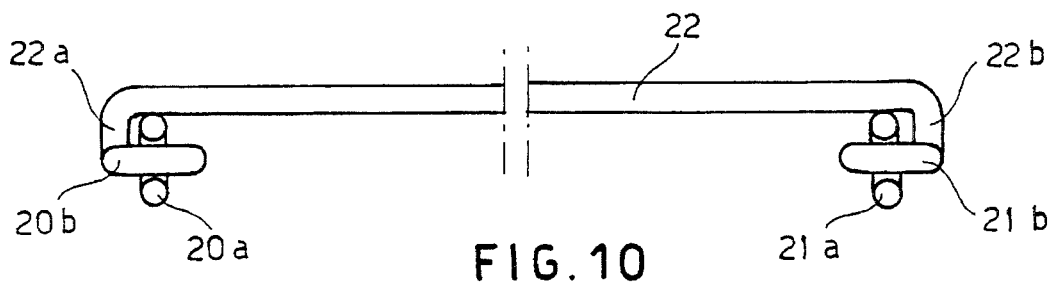
FIG. 10 is a schematic view showing a further embodiment of the attachment of the bars to the chains.

According to a further feature of the invention, shown in FIG. 10, it is possible to provide cross bars 22 with end portions 22a, 22b curved downwards to be attached to respective horizontal rings 20b, 21b in order to define said spacers. This solution has the advantage of facilitating assembly of the bars 22 to the chains, in that welding in this case requires the mere attachment of the end tips of the bars to the chains, while the use of separate shims or spacers first requires welding of the latter to the chain and then the attachment of the bars to the spacers; this leads to faster and more economical welding.

Moreover, in order to define a conveying surface of the belt which is as even and compact as possible in order to transport small-sized products too, for the present invention it is possible to provide, instead of a belt in which a single bar is attached to a ring of each chain as has been the case hitherto, a belt in which several bars can be grouped together on a single ring of the chain, as shown in FIG. 8, in which two bars are attached to the vertical rings and in FIG. 9 where two bars are also fixed to the horizontal ring. Obviously it is also possible to provide groups of bars with a higher number of bars than the two shown on each ring of the chain.

FIG. 6 also shows that the spacers 33 preferably have a rectangular section, which does not create potential friction in that it does not project outside of the rings of the chain. Said shims or spacers nevertheless may have any suitable form whatsoever.

It can also be seen from the figures how said shims can be placed both on the external branch of the horizontal rings and on the internal one, taking care, should the various guide and centering elements be arranged near the chain, to arrange the shim or spacer on the side of the chain opposite the one turned towards the adjacent guide or centering element so as to reduce further causes of friction.

The intent is that what has been said and shown with reference to the accompanying drawings has been given merely by way of an example of the innovative principles of the conveyor according to the invention.

What is claimed is:

1. In a chain conveyor comprising a support structure for an endless conveyor belt, sliding along guide means which develop along a predetermined path, in which the conveyor belt comprises a first and a second drive chain formed by loop elements, the loop elements of one of the chains being connected to corresponding loop elements of the other chain by means of cross bars, and means for driving the belt comprising at least one drive wheel which drives one of said chains; the improvement wherein the means for guiding the belt comprise, on the lower side of the belt, a first and a second longitudinal element respectively for the support and sliding of the cross bars, and wherein along at least predetermined parts of the path of the belt, elements for the lateral centering of the chains are provided, arranged parallel to said slide elements, and on at least one side of the drive chains themselves, and longitudinal restraining elements designed to prevent the belt from rising and arranged above the cross bars at the side edges of the belt.

2. In a chain conveyor comprising a support structure for an endless conveyor belt, sliding along guide means which develop along a predetermined path, in which the conveyor belt comprises a first and a second drive chain formed by loop elements, the loop elements of one of the chains being connected to corresponding loop elements of the other chain by means of cross bars, and means for driving the belt comprising at least one drive wheel which drives one of said chains; the improvement wherein the means for guiding the belt comprise, on the lower side of the belt, a first and a second longitudinal element respectively for the support and sliding of the cross bars, and wherein along at least predetermined parts of the path of the belt, elements for the lateral centering of the chains are provided, arranged parallel to said slide elements, and on at least one side of the drive chains themselves, said wheel for driving the belt being arranged tangentially in the plane of the drive chain, inside the conveyor.

3. In a chain conveyor comprising a support structure for an endless conveyor belt, sliding along guide means which develop along a predetermined path, in which the conveyor belt comprises a first and a second drive chain formed by loop elements, the loop elements of one of the chains being connected to corresponding loop elements of the other chain by means of cross bars, and means for driving the belt comprising at least one drive wheel which drives one of said chains; the improvement wherein the means for guiding the belt comprise, on the lower side of the belt, a first and a second longitudinal element respectively for the support and sliding of the cross bars, and wherein along at least predetermined parts of the path of the belt, elements for the lateral centering of the chains are provided, arranged parallel to said slide elements, and on at least one side of the drive chains themselves, wherein there are cogged drive wheels, for a chain of the belt, arranged tangentially in a plane perpendicular to the conveyor belt.

4. In a chain conveyor comprising a support structure for an endless conveyor belt, sliding along guide means which develop along a predetermined path, in which the conveyor belt comprises a first and a second drive chain formed by loop elements, the loop elements of one of the chains being connected to corresponding loop elements of the other chain by means of cross bars, and means for driving the belt comprising at least one drive wheel which drives one of said chains; the improvement wherein the means for guiding the belt comprise, on the lower side of the belt, a first and a second longitudinal element respectively for the support and sliding of the cross bars, and wherein along at least predetermined parts of the path of the belt, elements for the lateral centering of the chains are provided, arranged parallel to said slide elements, and on at least one side of the drive chains themselves, the means for driving the belt comprising a first and a second drive wheel, coplanar and distanced one in relation to the other and lying in the same plane as the belt, and a continuous element wound on said wheels and driven by them, said continuous element having projecting teeth for engaging with and driving a chain of the belt, said drive system being disposed outside of the conveyor belt.

5. In a chain conveyor comprising a support structure for an endless conveyor belt, sliding along guide means which develop along a predetermined path, in which the conveyor belt comprises a first and a second drive chain formed by loop elements, the loop elements of one of the chains being connected to corresponding loop elements of the other chain by means of cross bars, and means for driving the belt comprising at least one drive wheel which drives one of said chains; the improvement wherein the means for guiding the belt comprise, on the lower side of the belt, a first and a second longitudinal element respectively for the support and sliding of the cross bars, and wherein along at least predetermined parts of the path of the belt, elements for the lateral centering of the chains are provided, arranged parallel to said slide elements, and on at least one side of the drive chains themselves, said cross bars being welded to loop elements of the chains in a plane overlying the chains themselves with the interposition of spacers to predetermine the plane between the bars.

6. A chain conveyor according to claim 5, in which said cross bars comprise groups of bars in which each group has at least two bars and is attached on respective and corresponding loop elements of the chains.

7. A chain conveyor according to claim 5, in which said cross bars defining the conveying surface of the belt comprise end portions curved downwards to define said spacers.

* * * * *